United States Patent
Hickey et al.

(10) Patent No.: US 6,571,046 B1
(45) Date of Patent: May 27, 2003

(54) PROTECTOR SYSTEM FOR FIBER OPTIC SYSTEM COMPONENTS IN SUBSURFACE APPLICATIONS

(75) Inventors: Kurt A. Hickey, Humble, TX (US); Mark D. Hamilton, Aberdeen (GB)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/664,821

(22) Filed: Sep. 19, 2000

Related U.S. Application Data
(60) Provisional application No. 60/155,632, filed on Sep. 23, 1999.

(51) Int. Cl.[7] .................................................. G02B 6/36
(52) U.S. Cl. ........................................ 385/134; 385/135
(58) Field of Search ................................ 385/134, 133, 385/135; 439/191

(56) References Cited

U.S. PATENT DOCUMENTS

| | | | |
|---|---|---|---|
| 4,095,865 A | 6/1978 | Denison et al. | |
| 4,512,628 A | 4/1985 | Anderton | 350/96.2 |
| 4,603,737 A | 8/1986 | Spikes | 166/241 |
| 4,678,270 A | 7/1987 | Gunn et al. | 350/96.2 |
| 4,721,355 A * | 1/1988 | Gould | 385/136 |
| 4,744,622 A | 5/1988 | Cherry et al. | 350/96.2 |
| 4,799,544 A * | 1/1989 | Curlett | 166/65.1 |
| 4,799,757 A | 1/1989 | Goetter | 350/96.2 |
| 4,836,641 A | 6/1989 | Priaroggia | 350/96.23 |
| 5,070,940 A * | 12/1991 | Conner et al. | 166/65.1 |
| 5,479,553 A | 12/1995 | Daems et al. | 385/135 |
| 5,485,745 A * | 1/1996 | Rademaker et al. | 73/152.39 |
| 5,519,804 A | 5/1996 | Burek et al. | 385/135 |
| 5,659,651 A * | 8/1997 | Watanabe | 385/138 |
| 5,825,963 A | 10/1998 | Burgett | 385/135 |
| 6,145,597 A * | 11/2000 | Kobylinski | 166/384 |
| 6,213,202 B1 * | 4/2001 | Read, Jr. | 166/55.1 |
| 6,269,198 B1 * | 7/2001 | Hodgson et al. | 385/13 |

FOREIGN PATENT DOCUMENTS

| | | |
|---|---|---|
| GB | 2 171 815 | 9/1986 |
| GB | 2 265 397 | 9/1993 |
| GB | 2 283 035 | 4/1995 |
| GB | 2 348 224 | 9/2000 |
| WO | WO 00/36386 | 6/2000 |

\* cited by examiner

Primary Examiner—Lynn Field
Assistant Examiner—Michael C. Zarroli
(74) Attorney, Agent, or Firm—Cantor Colburn LLP

(57) ABSTRACT

A downhole fiber optic protection system is disclosed which includes at least one protector sub mounted in a downhole string, the protector sub having at least one recess formed in an outside diameter of the protector sub and optionally including component protectors mounted to the outside diameter of the protector sub whereby the one or more recesses in the outside of the protector sub provide protection to fiber optic components and protected areas are created underneath component protectors further more delicate of the fiber optic connectors. The device is designed to prevent the harsh downhole environment from adversely affecting optical fibers themselves or optical components in the optical fiber system.

13 Claims, 16 Drawing Sheets

PROTECTOR SYSTEM FOR FIBER OPTIC SYSTEM COMPONENTS IN SUBSURFACE APPLICATIONS

CROSS REFERENCE TO RELATED APPLICATIONS

This application claims the benefit of an earlier filing date from U.S. Ser. No. 60/155,632, filed Sep. 23, 1999, the entire contents of which is incorporated herein by reference.

BACKGROUND OF THE INVENTION

1. Field of the Invention

The invention relates to the field of hydrocarbon exploration, drilling and production. More particularly, the invention relates to subsurface systems employing fiber optic conductors, connectors and instrumentation and protection required and desirable for the same.

2. Prior Art

In recent years, the use of fiber optic technology has grown in many industries. The benefits of using fiber optics where electric conductors were used previously has greatly improved communications in both the quality of information transmitted and received, and the speed of communication. Unfortunately however, many of the benefits of fiber optic technology have not heretofore been available to the hydrocarbon exploration, drilling and production industry due to the extremely unfavorable conditions downhole. These, of course, are high pressure, high temperature, vibration, caustic fluids, etc. All of these conditions collectively and individually are significantly deleterious to delicate optic fibers and would cause very early failures requiring workovers in production wells if employed as they have been in other industries. Because of this, the incorporation of optic fibers downhole, in all but the most limited of circumstances, has been contraindicated. Due to the technological benefits of fiber optic usage, the industry is in need of a way to deploy and employ fiber optics reliably in the downhole environment.

SUMMARY OF THE INVENTION

The above-identified drawbacks of the prior art are overcome, or alleviated, by the fiber optic protection system of the invention.

Fiber optic conductors, connectors, instrumentation, sensors and associated control circuitry (hydraulic/electrical/optical), etc. are now employable in the downhole environment in connection with the invention disclosed herein. The protection system insulates fiber optic technology from the unfavorable conditions existing downhole so that such technology may be reliably employed, thus allowing the subsurface portion of the hydrocarbon industry to reap the benefit of fiber optic technology. Optical fibers allow greater accuracy and speed of determining information downhole. Decisions are faster made and adjustments in different zones may be executed quicker to enhance production of desired fluids while retarding production of undesirable fluids.

The scope of the invention also includes the routing of surface supplied power (hydraulic/electrical/optical) through a protected environment to the downhole fiber optic components to selectively supply said power to any number of a multitude of downhole tools, as desired.

BRIEF DESCRIPTION OF THE DRAWINGS

Referring now to the drawings wherein like elements are numbered alike in the several FIGURES.

DETAILED DESCRIPTION OF THE INVENTION

Fiber optic systems for downhole monitoring and control are most favorably placed within a protected environment in a housing. The housings include beveled edges to avoid impact or shock loading on corners during running into the well and they include protective covers over all exposed openings for the same purpose. Moreover, the fiber optic components being employed are preferably mounted in a vibration/shock load dampening material (for example, teflon, metal, or similar), which is chemically inert with respect to the well content, to guard them for any vibration or shock loading that does occur.

Figure 1:
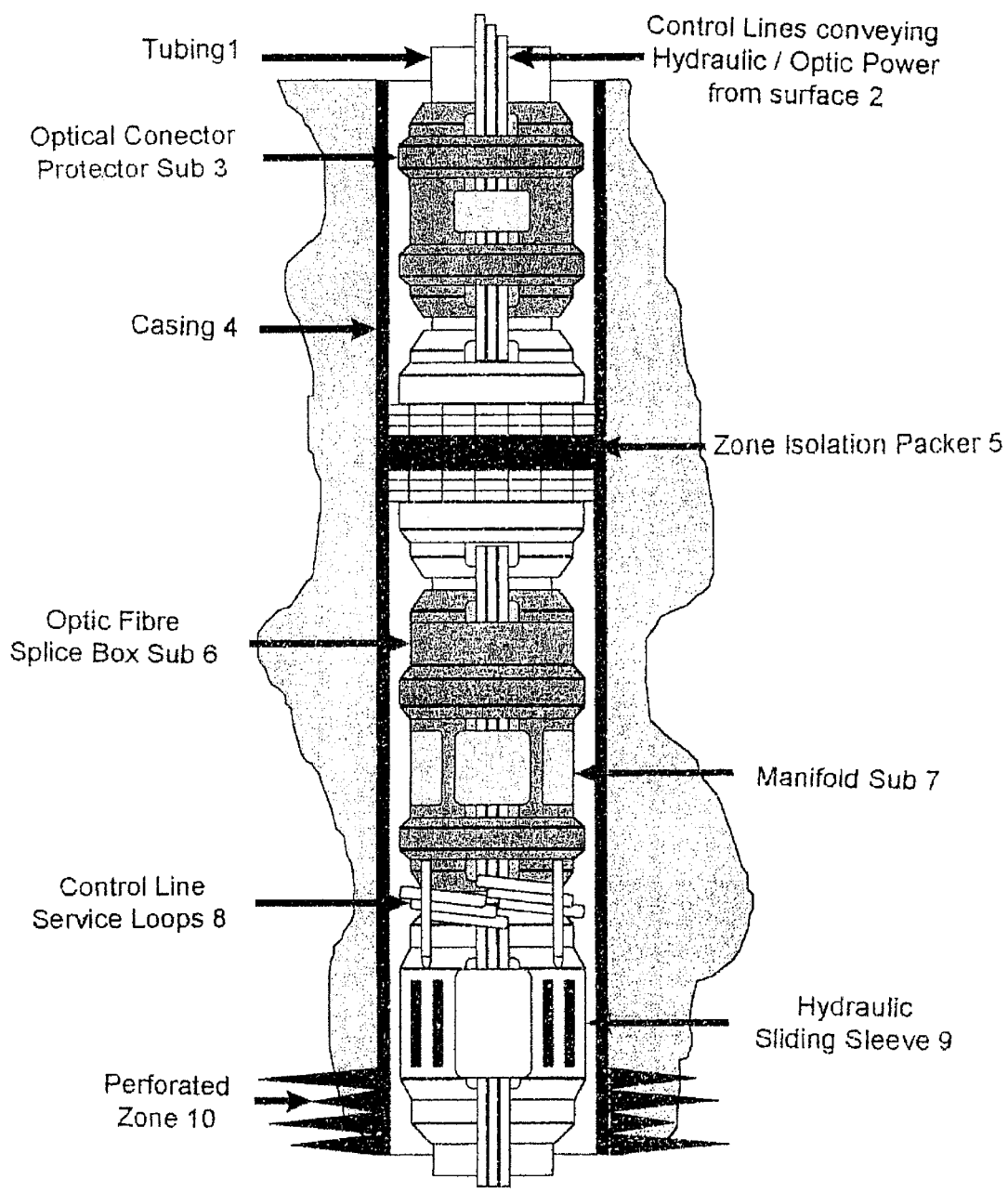
FIG. 1 is a schematic representation of the protection system of the invention connected with the other tools.

In order to provide one of skill in the art an understanding of the concept embodied by the invention, FIG. 1 illustrates several downhole tools and optic components in one possible configuration. The drawing is schematic but is apt to illustrate the concept of the invention. The manifold sub 7 houses many of the fiber optic components such as optic dry-mate connectors, optic splices, fiber optic service loops, optic hydraulic valves, optic-electric valves, fiber optic pressure sensors, fiber optic temperature sensors, optic wet-mate connectors, etc. and is an important subassembly of the protection system disclosed in more detail hereunder. Other protective sub-assemblies are also illustrated in FIG. 1 referring to the splice box 6 (which may or may not be integral to the manifold sub), service loops 8 and connector subs 3. Each provides protection against mechanical loading, temperature effects and pressure effects. The components also include outer features to reduce the occurrence of impacts with other structures while being run into the hole. These too are discussed hereunder.

Figure 2:
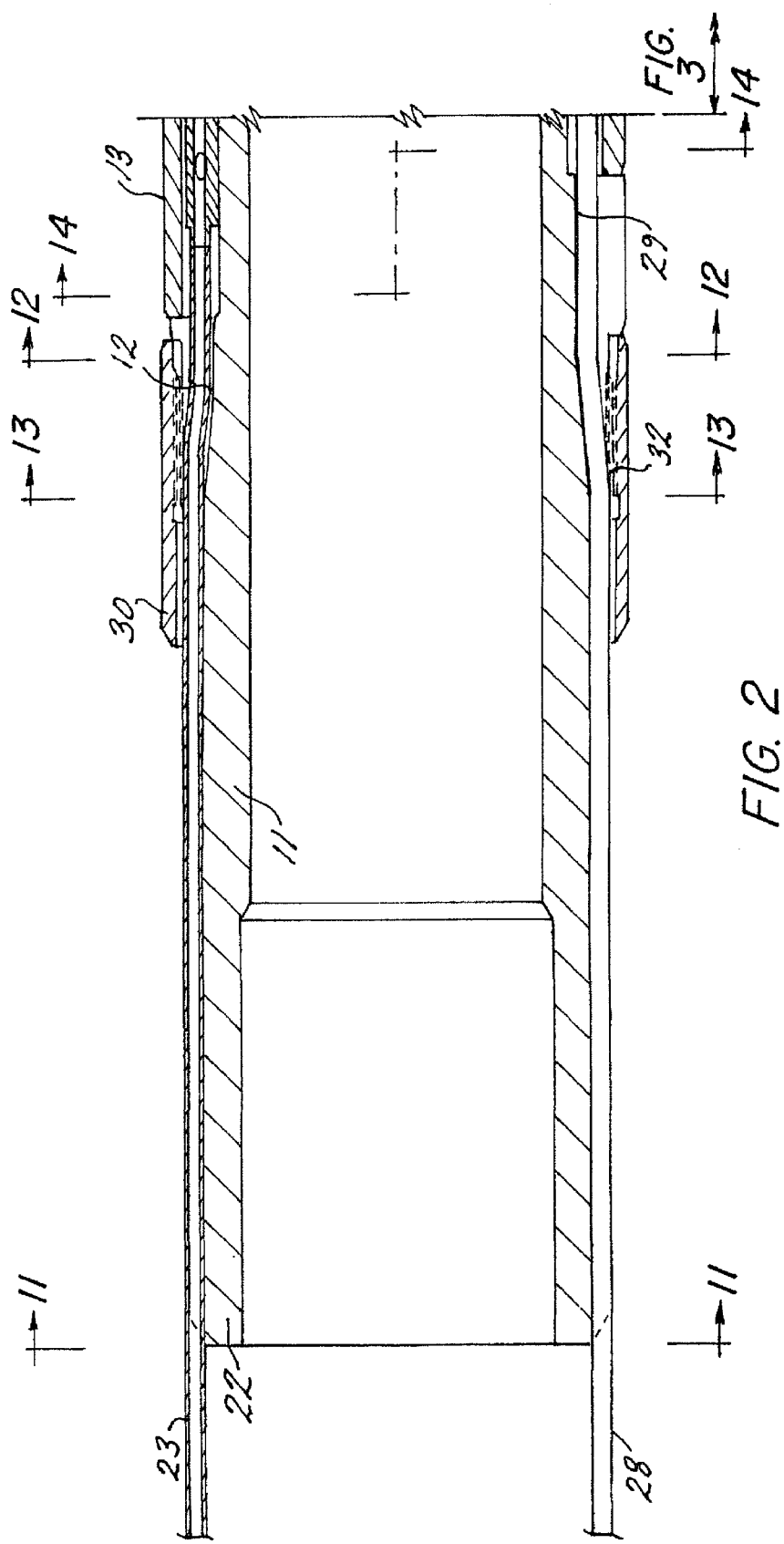
FIGS. 2–4 is an elongated longitudinal cross-section view of the manifold sub of the invention.
Figure 3:
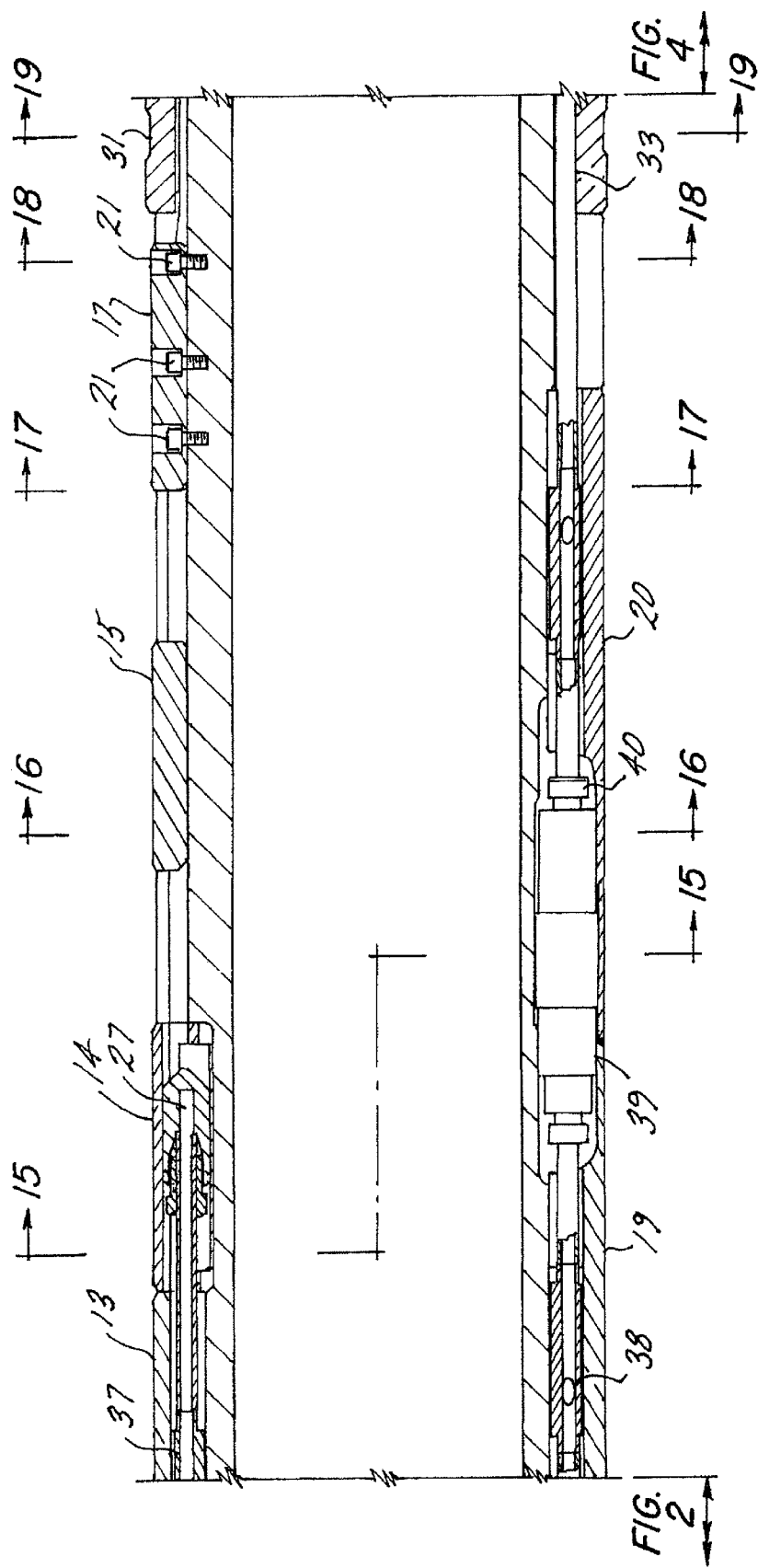
Figure 4:
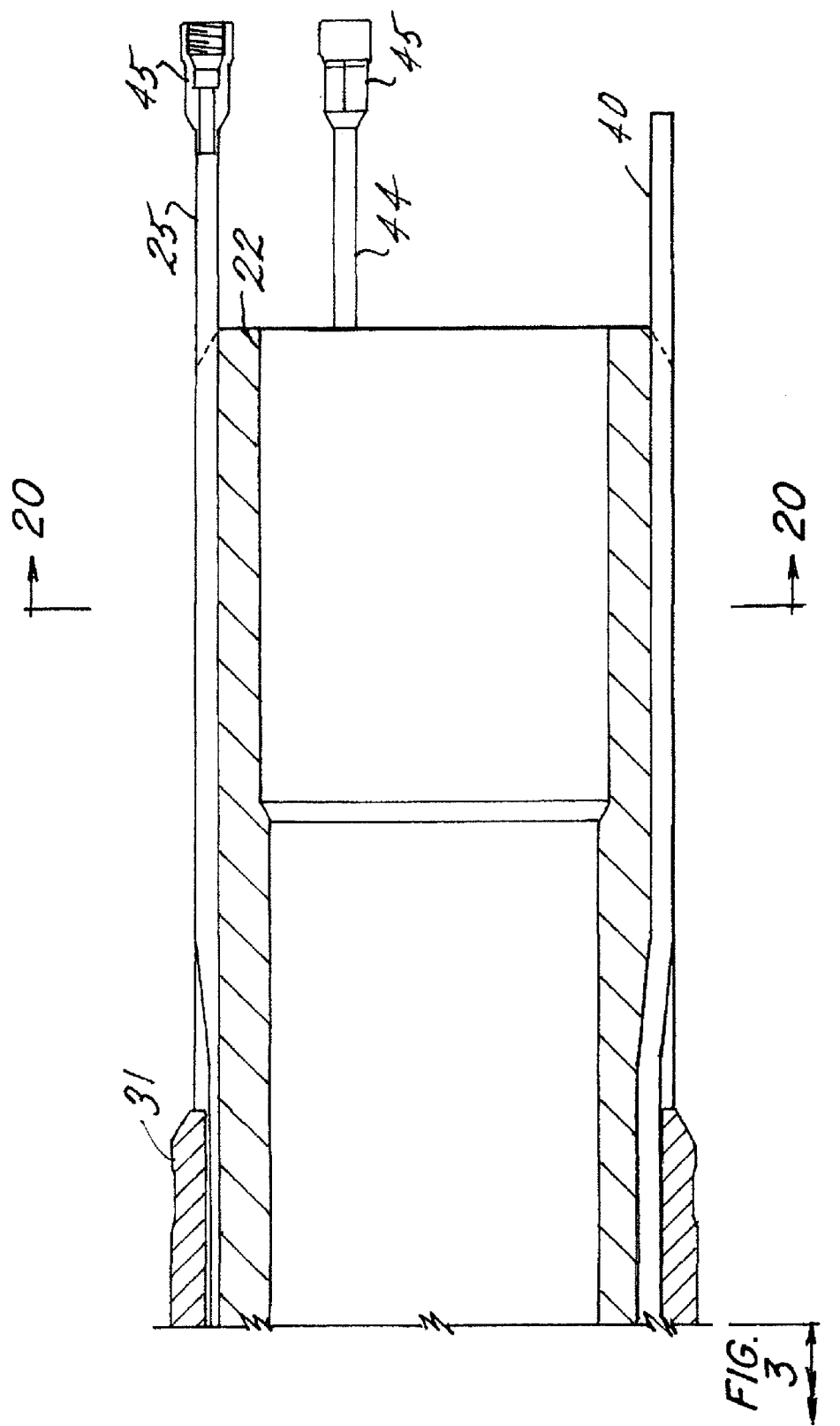

In a particular embodiment of the manifold sub 7, referring to FIGS. 2–4, control lines conveying optic fibers and hydraulic fluid, optic fiber components and associated control components are illustrated in various cross sectional and plan views. One of skill in the art will recognize that all of the conduits in the manifold sub 7, be they optic fiber or hydraulic control lines, are protected within the manifold sub body 11 between a centrally located recessed channel 12 in the manifold sub body 11 and the outer surface of the manifold sub body 11, or one of a series of component protectors 13–20. It is to be understood that a protected space is provided under each of the component protectors.

In one embodiment, the component protectors 13–20 are designed so that they are flush with, or below the outer surface of the manifold sub body 11. This reduces the risk of the component protectors 13–20 catching on another structure downhole and causing an impact or shock load to be transmitted to the components housed within the manifold sub. The component protectors 13–20 have beveled edges to ensure against impact loading on corners while running. The component protectors 13–20 are secured over the various fiber optic components housed within the manifold sub 7 to form an interference fit, such that substantial load must be applied, via a distributed load system comprising of a multitude of cap screws 21 being threadedly connected to the manifold sub body 11 through a series of clearance holes 70 (visible in some views only) in the component protector 13–20, to deflect the component protector material adequately to fully secure the component held therein against vibrational/load effects. The cap screws 21 are locked in place with locking washers, or thread locking adhesive, or similar, to ensure against load dissipation. Additionally, the component protectors 13–20 are manufactured very accurately to form a very close fit between the component protectors 13–20 and the recessed channels 12 and 29 in the manifold sub body 11 into which they are installed. This ensures against axial movement and lateral movement of the fiber optic components housed between the recesses in the manifold sub body 11 and the component protectors 13–20 due to tension/vibration effects within the connections to the fiber optic components. All component protectors 13–20 are easily replaceable without detriment to the other components of the manifold sub 7. Other features of specific component protectors 13–20 will be discussed in depth later in this document.

The manifold sub 7 is tubular and may be either concentric or eccentric with respect to the casing bore 4 within which the manifold sub 7 is located and places all of the control lines and fiber optic components (discussed hereunder) within the annular body thereof. The manifold sub 7 may be supplied with metal-to-metal sealing threaded connections 22 at either end to allow connection to the tubing 1, or other components of the system, as represented in FIG. 1. The manifold sub body 11 may in one embodiment be bored to accept certain components or may in another embodiment be milled radially to accept components which then are covered with component protectors 13–20 as noted previously, or both concepts are employable together. Well fluids are permitted to flow through the internal bore of the manifold sub 7 and within the annulus between the casing bore and outer surface of the manifold sub body 11.

Figure 12:
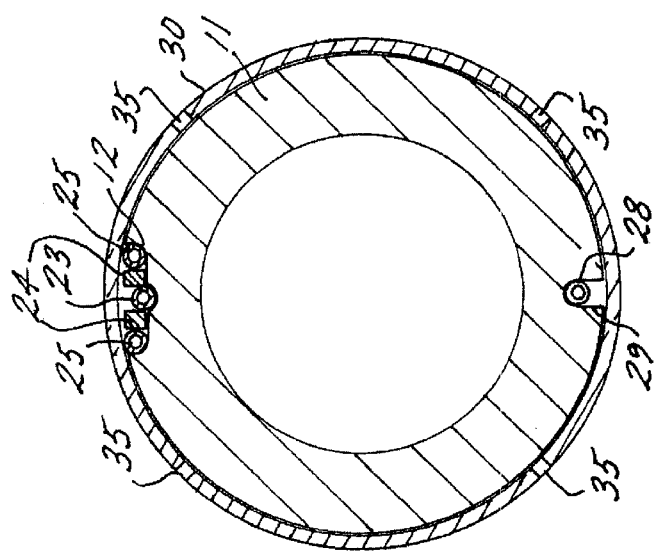
FIG. 12 is a cross-section view of the invention taken along section line 12—12 in FIG. 2.
Figure 11:
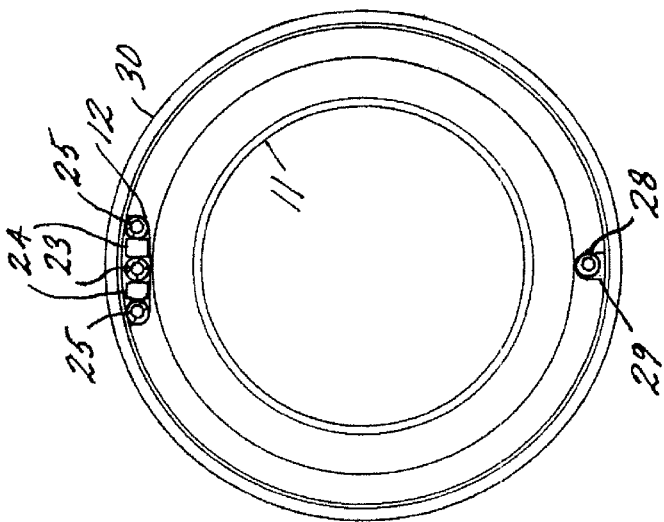
FIG. 11 is a cross-section view of the invention taken along section line 11—11 in FIG. 2.
Figure 16:
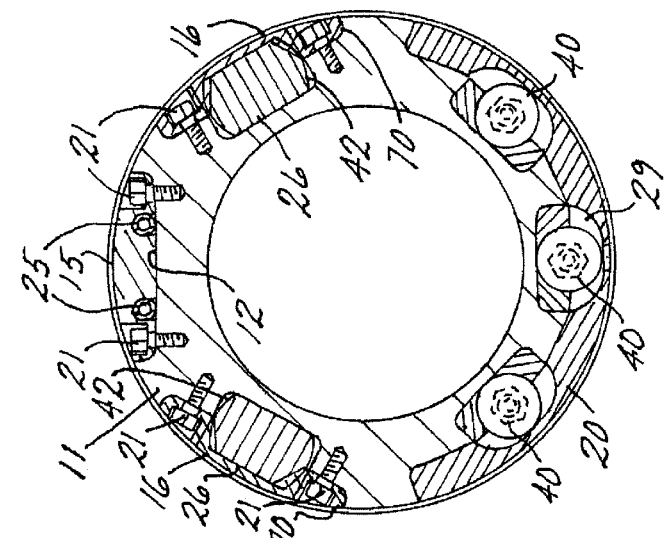
FIG. 16 is a cross-section view of the invention taken along section line 16—16 in FIG. 3.
Figure 15:
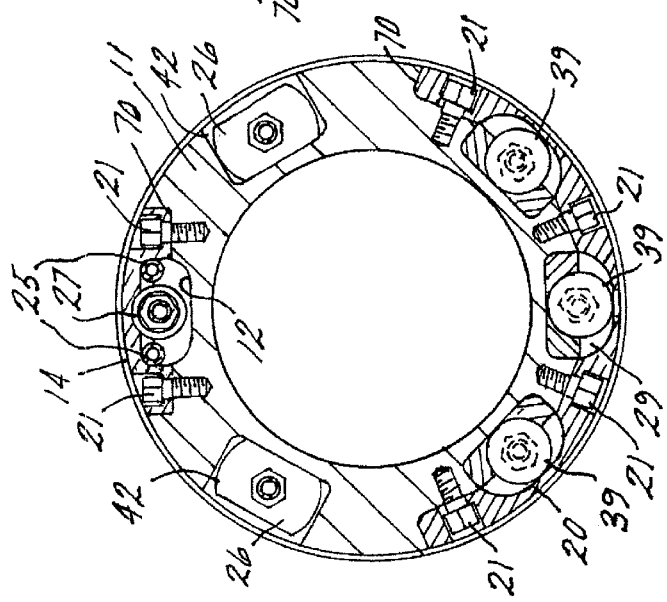
FIG. 15 is a cross-section view of the invention taken along section line 15—15 in FIG. 3.
Figure 19:
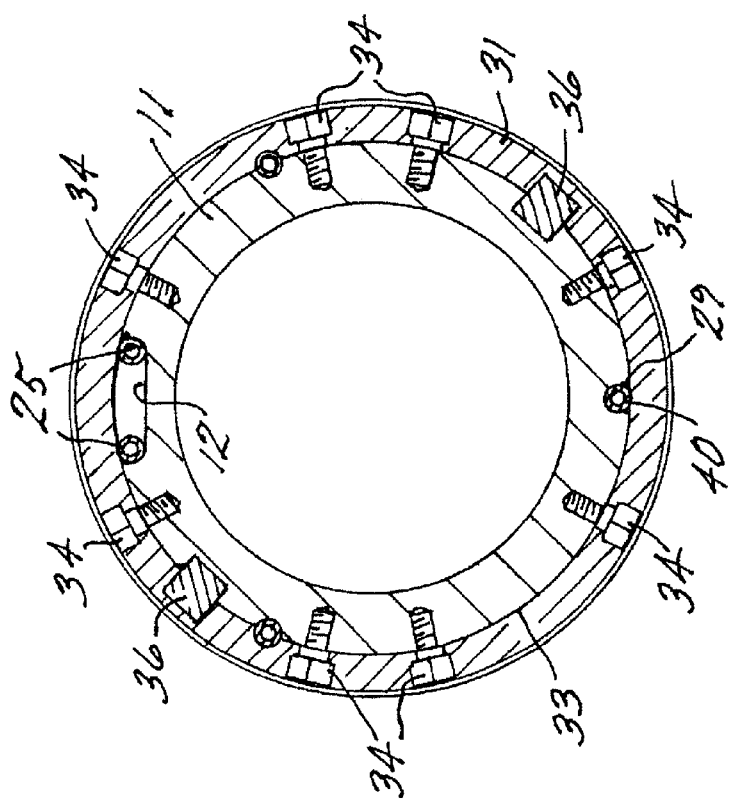
FIG. 19 is a cross-section view of the invention taken along section line 19—19 in FIG. 3.

Referring to FIGS. 2–4, the fiber optic working control line 23 (denoted thus as it contains the optic fibers which are connected to various fiber optic components housed within the manifold sub 7) is visible in the top half of the drawings. The fiber optic working control line 23 is housed in a recess 12 in the manifold sub body 11 which can be viewed in FIG. 11, which is a cross section view of the manifold sub 7 of the invention taken along section line 11—11 in FIG. 2. Also within this recess 12 are contained spacer rods 24 constructed of impact/vibration dampening material capable of withstanding downhole temperature and pressure and of being chemically inert with respect to the well content (for example, teflon, metal, or similar). On either side of the spacer rods 24 are hydraulic fluid input control lines 25 which may be connected to other devices within manifold sub 7, such as optic-hydraulic valves 26 as displayed in the particular embodiment, or pass therethrough, to another manifold sub 7 in the next well zone. Fiber optic working control line 23 is connected to other optic components within manifold sub 7 and is distributed within and without manifold sub 7. In the particular embodiment represented, fiber optic working control line 23 is connected to a number of optic-hydraulic valves 26 and a fiber optic pressure sensor 27, but various other fiber optic components could be employed within the manifold sub 7. Fiber optic connector control line 28 is also visible in the bottom half of FIGS. 2–4, and FIGS. 8–11 Fiber optic connector control line 28 is also housed in a radially milled recess 29 in the manifold sub body 11. It should be appreciated that all the control lines illustrated in FIGS. 2–10 are protected by an upper gauge ring 30 and lower guage ring 31, which preferably are annular portions of the manifold sub and are the maximum outer diameter of the manifold sub 7. Upper and lower guage rings 30 and 31 are specifically configured, manufactured and treated utilizing close tolerance fits and geometry that yields low stress levels during impact/shock and axial and rotational loading while running the manifold sub 7 into or out of the well. Upper and lower guage ring 30 and 31 have beveled edges to ensure a smooth transition to the maximum tool diameter and prevent shock loading on sharp corners. Upper and lower guage ring 30 and 31 ensure that the manifold sub body 11 and component protectors 13–20 are not subjected to the mechanical forces encountered while traversing a well. A preferred method of connection of upper and lower guage ring 30 and 31 to manifold sub body 11 may be via a threaded connection 32 between guage ring 30 inner diameter and manifold sub body 11 outer diameter. An alternative method of connection may also be to split the guage ring 31 and install it in a turned recess 33 in the manifold sub body 11, retaining it in situation via a number of cap screws 34 threadedly connected to the manifold sub body 11. Rotational resistance may be provided by set screws 35 threadedly connected to the guage ring 30 and locked against manifold sub body 11, as shown in FIG. 12, or by a key 36 installed between guage ring 31 and manifold sub body 11, as shown in FIG. 19.

Figure 14:
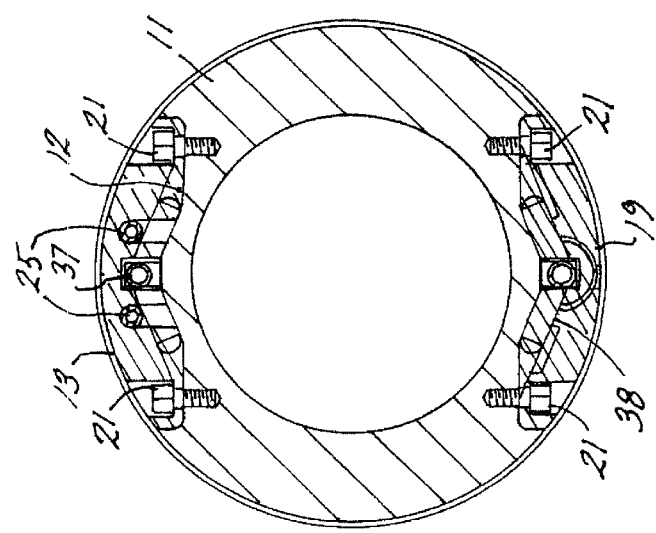
FIG. 14 is a cross-section view of the invention taken along section line 14—14 in FIG. 2.
Figure 18:
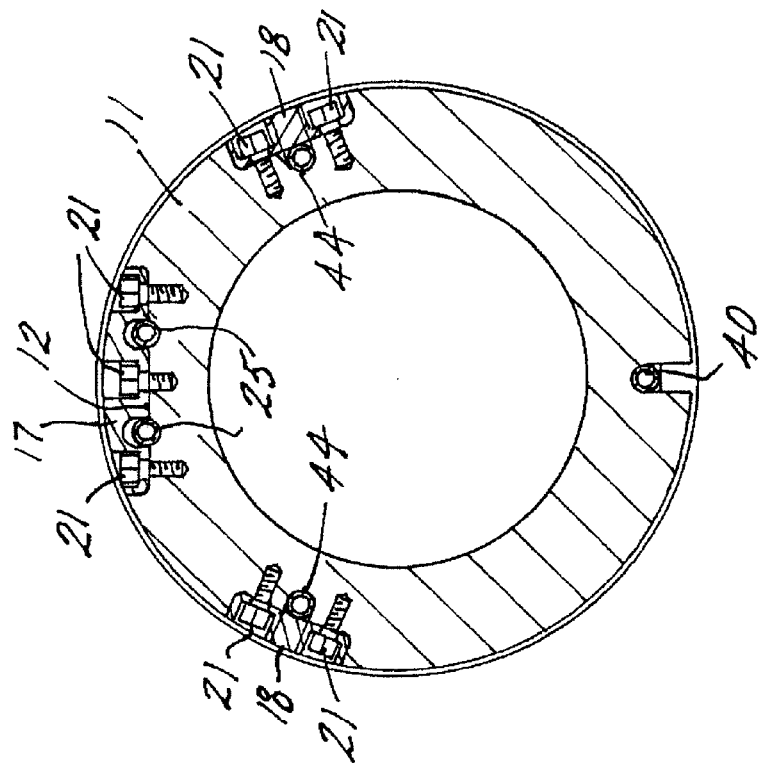
FIG. 18 is a cross-section view of the invention taken along section line 18—18 in FIG. 3.
Figure 17:
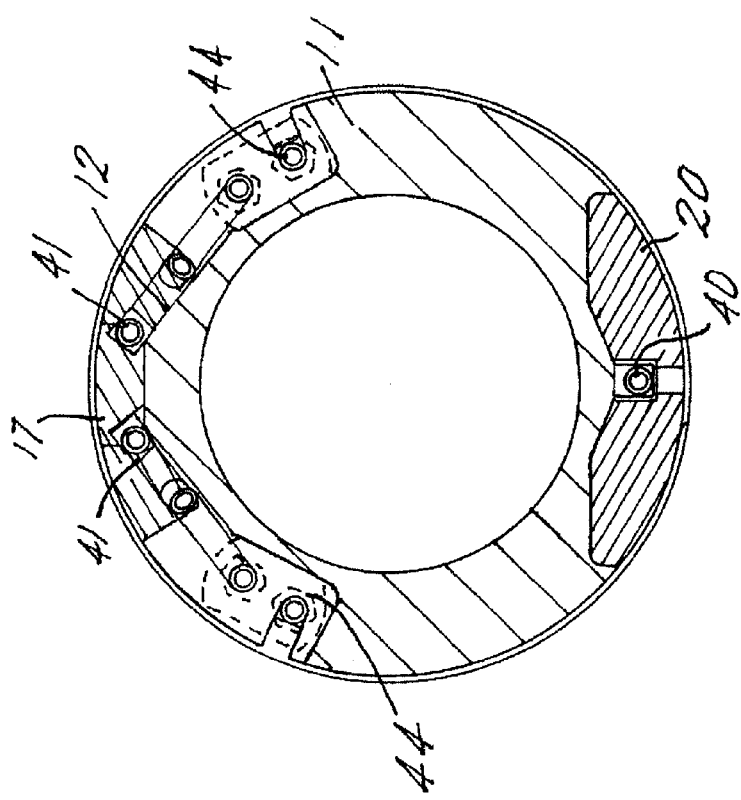
FIG. 17 is a cross-section view of the invention taken along section line 17—17 in FIG. 3.
Figure 20:
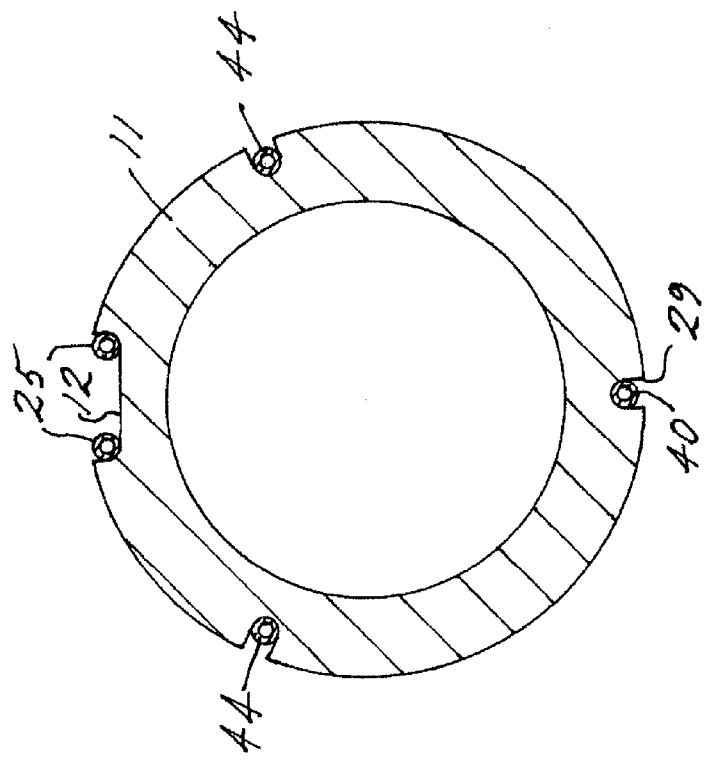
FIG. 20 is a cross-section view of the invention taken along section line 20—20 in FIG. 4.

In FIG. 3 and FIG. 14, a component protector 13 covers, protects and further insulates the fiber optic 3-way angled junction 37, which distributes various optic fibers safely and without imparting excessive bending stresses within the fiber to the various optic components housed within the manifold sub 7. Also shown in FIGS. 2–10 and FIGS. 14 and 15, component protector 19 protects the fiber optic 3-way angled junction 38 and a multitude of optical connectors 39 connected to it. It should be appreciated that all pressure resisting connections between components of the protection system are of a non-elastomeric nature or metal-to-metal sealing and the protection system has been designed such that all potential leak paths have been optimized. Methods of eliminating potential leak paths include welding of component sub-assemblies together. Component protector 19 includes profiles such that the optical connectors 39 are prevented from rotational movement during threaded connection make-up to the mating end of the optical connector 40. This feature assists in assembly procedures while running the protection system into the well and attaching the necessary ancillary optic fiber control equipment.

Referring now to FIGS. 2–7 and FIG. 15, pressure sensor 27 is illustrated between the radially milled recess 12 in the manifold sub body 11 and the component protector 14. Fiber optic working control line 23 terminates at the pressure sensor 27. Hydraulic fluid input control lines 25 continue through the milled recess 12 in manifold sub body 11 and are restrained from vibration and protected from mechanical loading by component protector 15, shown in FIGS. 2–7 and FIG. 16. Dependant on required length of hydraulic fluid input control lines 25 within manifold sub 7, and number of components to which they are attached, a multitude of such component protectors 15 may be used. Prior to exiting the manifold sub body 11, below the lower guage ring 31, hydraulic fluid input lines 25 are, in this embodiment, weldedly connected to angled junction pieces 41, shown in FIGS. 5–7 and FIG. 17. Angled junction pieces 41 are installed in the milled recess 12 in the manifold sub body 11 and covered by another component protector 17, providing the same function as previously described component protectors 13–20. Angled junction pieces 41 are used to reduce the otherwise unacceptable bend radius of the control line in order that it can be safely installed within the confines of the milled recess 12 within the manifold sub body 11. The angled junction piece 41 routes hydraulic fluid, in this embodiment, to the input side of an optic-hydraulic valve 26, located between a recess 42 in the manifold sub body 11 and a component protector 16. The recess 42 housing the optic-hydraulic valve 26 is connected to the main recess 12 in the manifold sub body 11 via a radially milled connecting slot 43. Hydraulic fluid output lines 44 are connected to the output side of the optic-hydraulic valves 26 and exit the manifold sub body 11 via a continuation of the milled recess 42 in which the optic-hydraulic valve 26 is housed. Component protector 18 is installed over the recess 42 to prevent vibration of the hydraulic fluid output control line 44 and to protect it from mechanical loading, as shown in FIGS. 5–7 and FIG. 18. Dependant on the configuration of the manifold sub 7, a multitude of component protectors 18 may be required.

Referring now to the bottom half of FIGS. 2–4, FIGS. 8–10 and FIG. 16, the optical connectors 39, installed in the recesses in the manifold sub body 11 are connected to the mating ends of the optical connector 40. This sub-assembly is not part of the manifold sub 7 per se, but is ancillary control equipment installed during running of the manifold sub 7 into the well, and is shown for illustrative purposes only. In order to connect the mating end of the optical connector 40 to the optical connector 39, it is necessary to remove the component protector 20. The component protector 20 is secured by cap screws 21 which have been selected for ease of removal and installation in an offshore environment. The component protector 20 is a one-piece assembly, again to assist in disassembly/assembly procedures. The bottom half of the lower guage ring 31 is also removed from it's turned recess 33 in the manifold sub body 11 and the mating end of the optical connector 40 is installed within the milled recess 29 in the manifold sub body 11. Upon making up the threaded connection between the mating end of the optical connector 40 and the optical connector 39, the bottom half of the lower gauge ring 31 and the component protector 20 are replaced, the cap screws 21 and 34 locked in position, via locking washers, or thread adhesive, or similar. Referring now to FIGS. 2–7, the hydraulic fluid input lines 25 and hydraulic fluid output lines 44 may terminate in special connection ports 45, welded onto the end of each of the lines. These connection ports 45 accept control lines connected to downhole tools, such as the Hydraulic Sliding Sleeve 9, as shown in FIG. 1, below the manifold sub 7, and provide a method of sealing the conduit against well conditions such as temperature, pressure and well content. Typically, such seals will be of a metal-to-metal nature.

Within the context of the invention, the manifold sub 7 protects optic fiber component assemblies from the unfavorable conditions existing downhole. However, as the system is designed to protect hardwired optic components and fibers, there is also a need to provide a protected environment in which to house the required splices between individual optical fibers. While splicing of separate optical fibers together is common practice in many industries, and provisions exist for housing said splices, there are no existing enclosures which protect against the unfavorable conditions experienced downhole. Referring to FIG. 1, the optic fiber splice box sub 6 of the invention houses these splices in a secure environment, providing protection from the conditions within the well, be they temperature, pressure, or mechanical loading, or a combination thereof. While the drawing is schematic, it is apt to illustrate the concept of the invention. The optic fiber splice box sub 6 is an important sub-assembly of the protection system disclosed in more detail hereunder.

Figure 5:
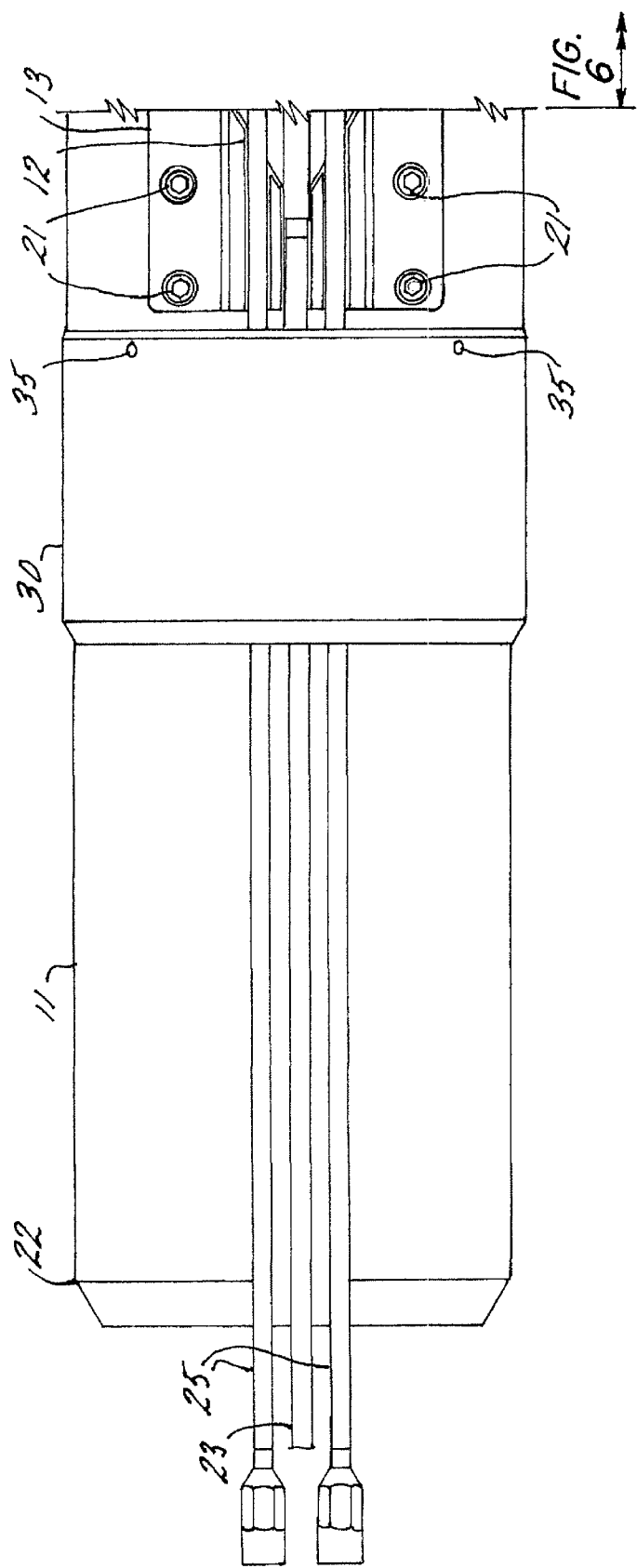
FIGS. 5–7 is an elongated plan view of the top of the manifold sub of the invention.
Figure 6:
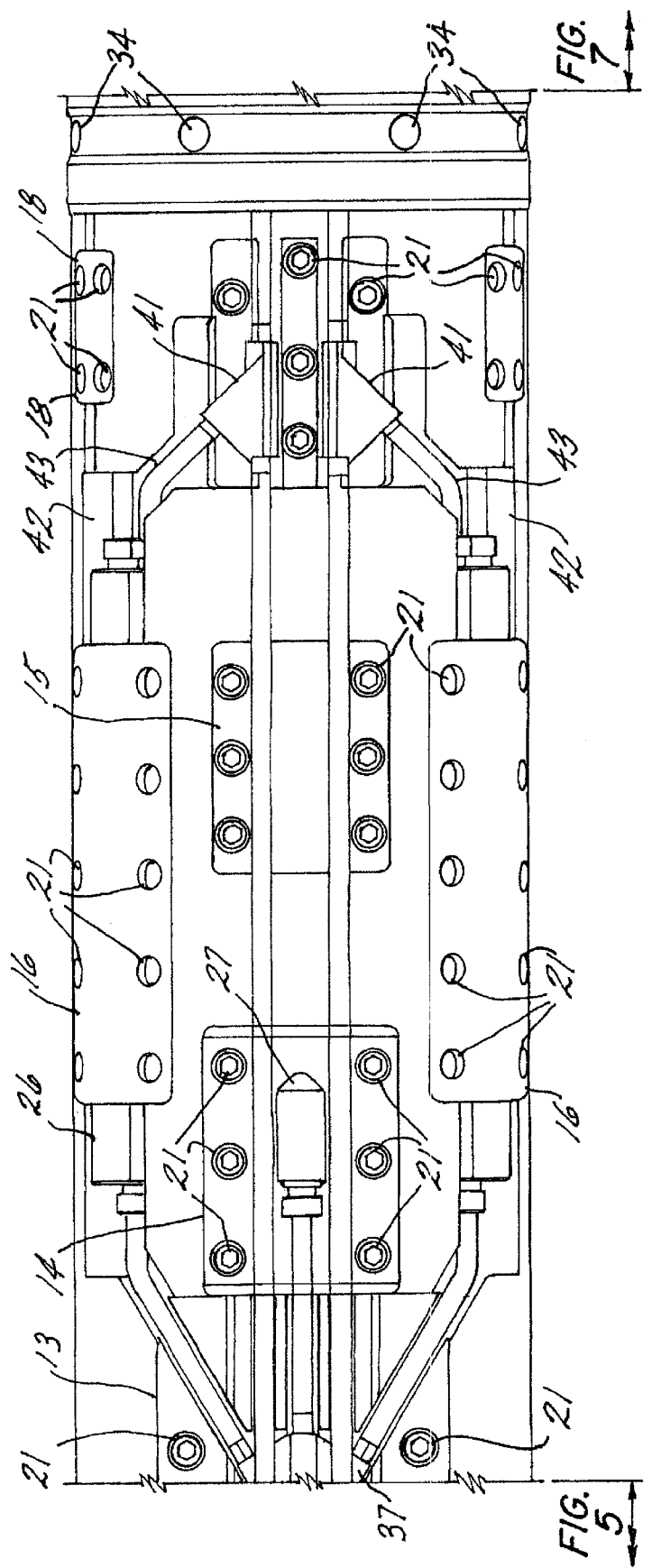
Figure 7:
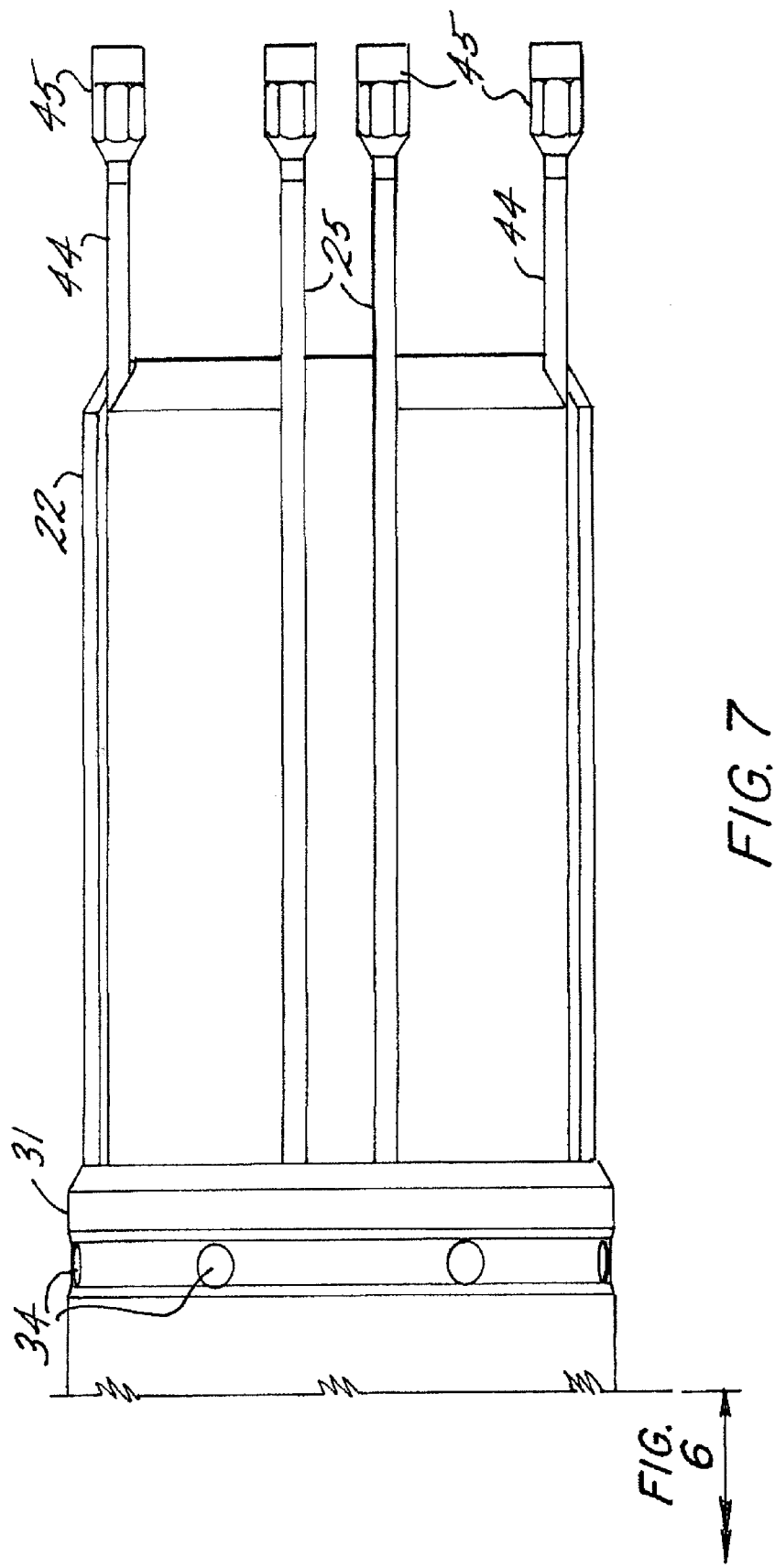
Figure 8:
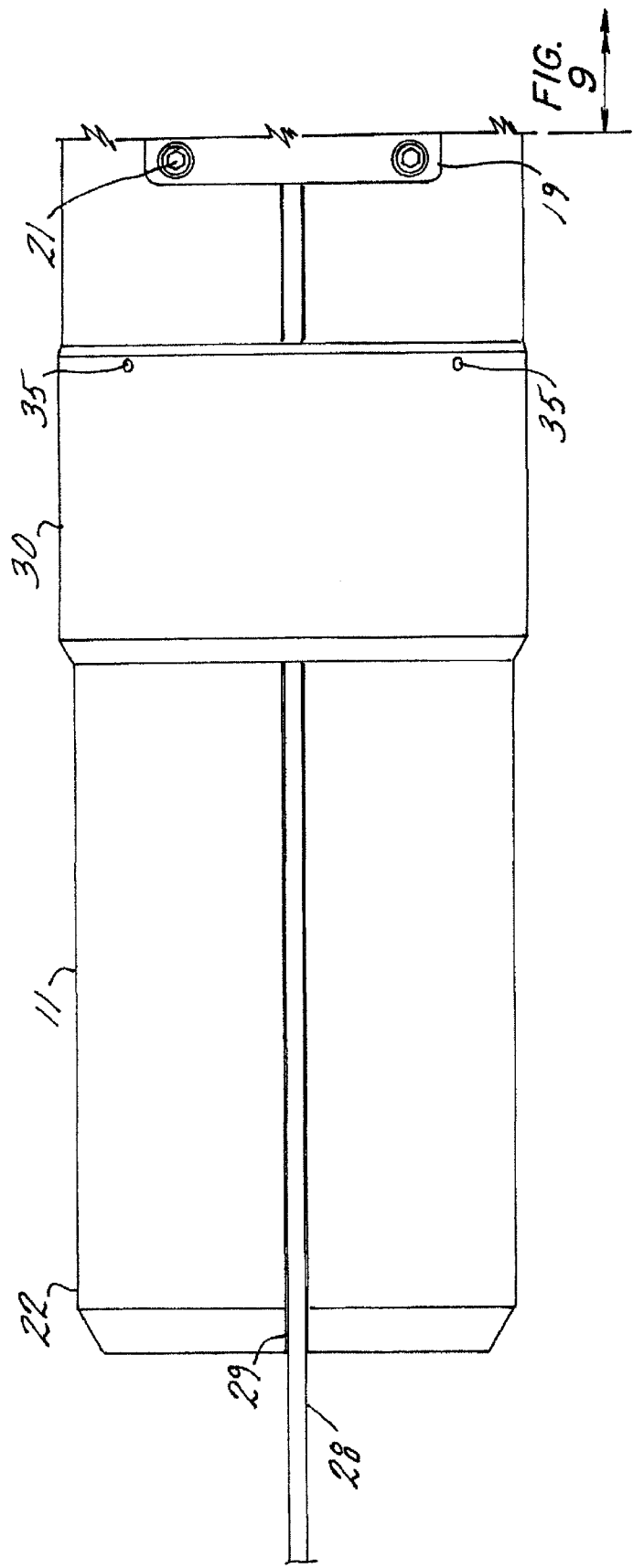
FIGS. 8–10 is an elongated plan view of the bottom of the manifold sub of the invention.
Figure 9:
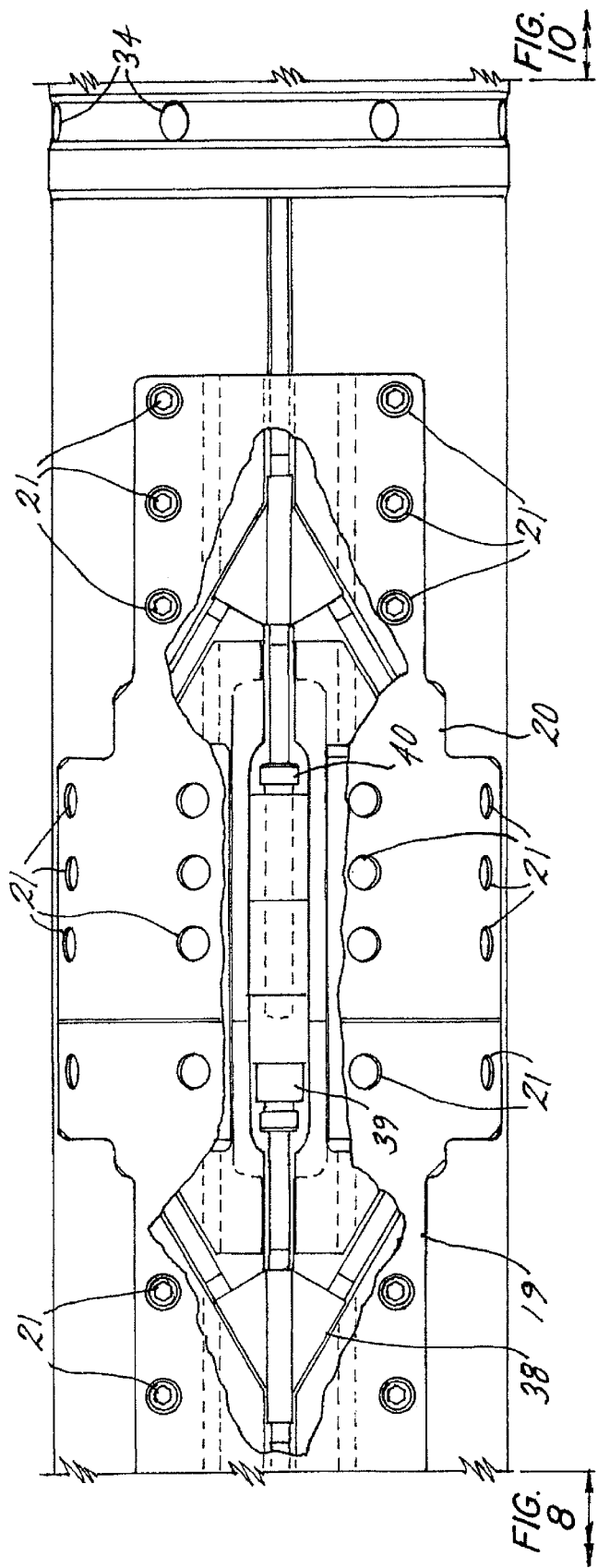
Figure 10:
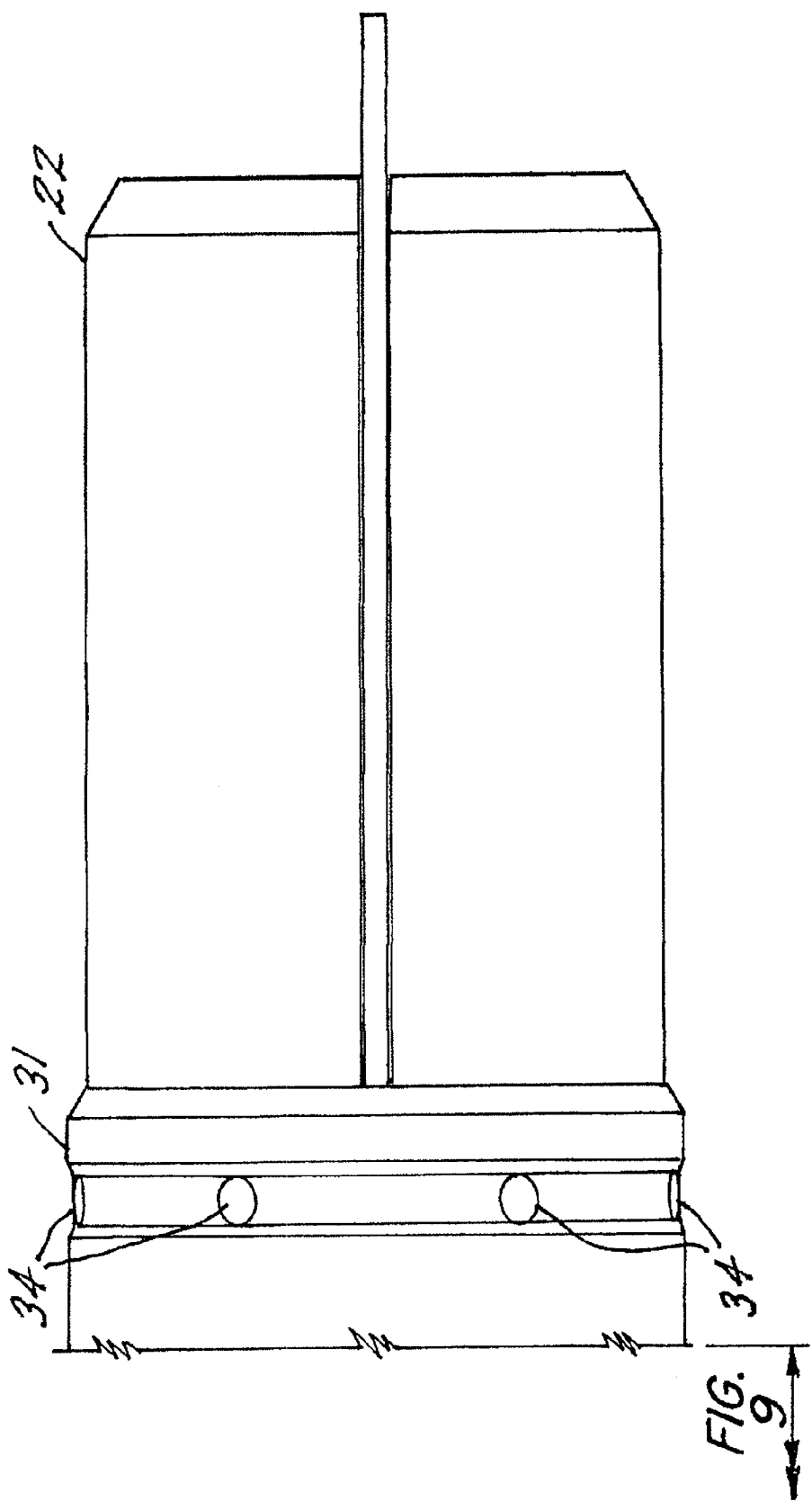
Figure 13:
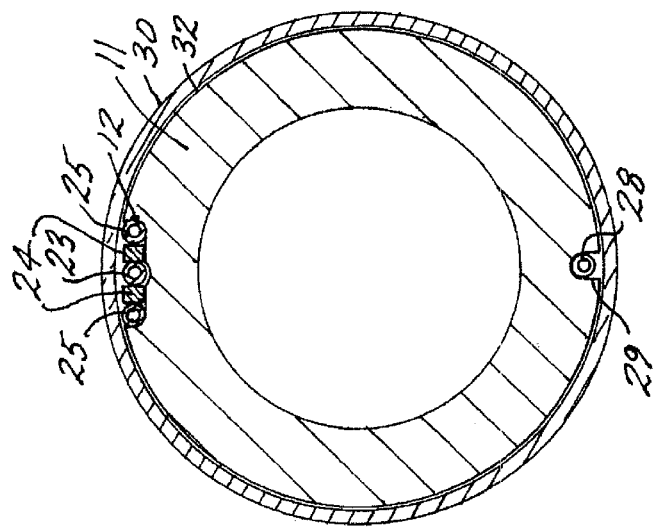
FIG. 13 is a cross-section view of the invention taken along section line 13—13 in FIG. 2.
Figure 21:
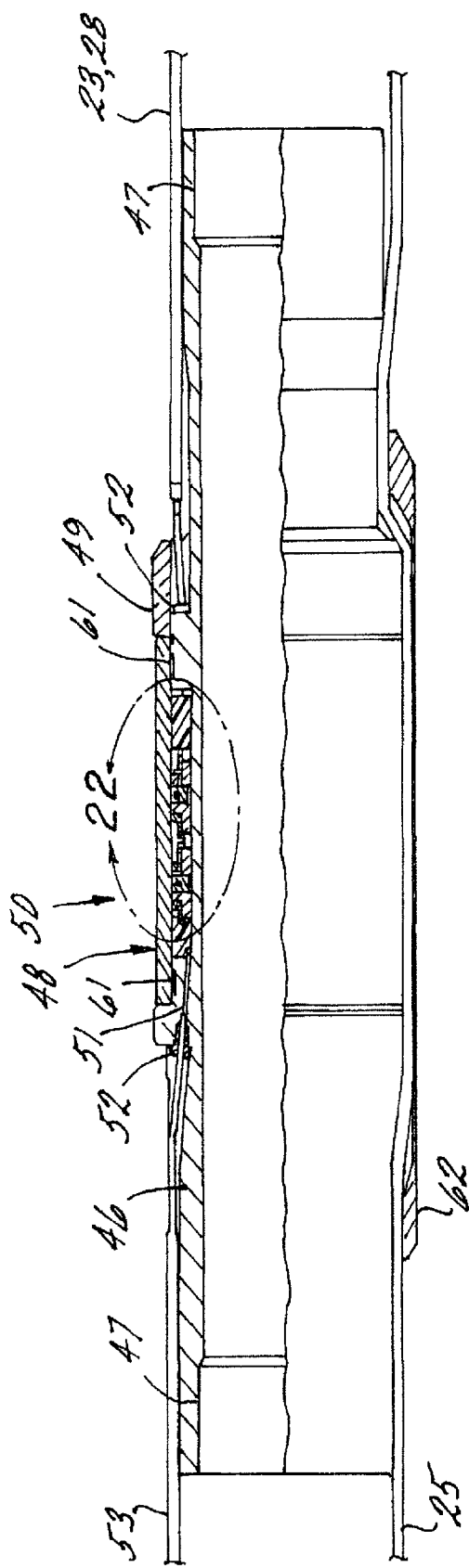
FIG. 21 is a schematic view of a partial cross-section of the splice box of the invention.
Figure 22:
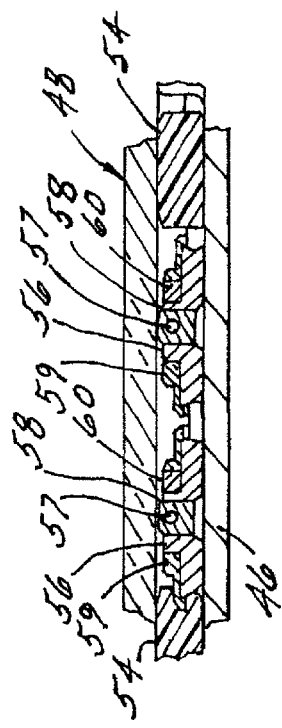
FIG. 22 is an enlarged view of the circumscribed area of the splice box in FIG. 21.
Figure 23:
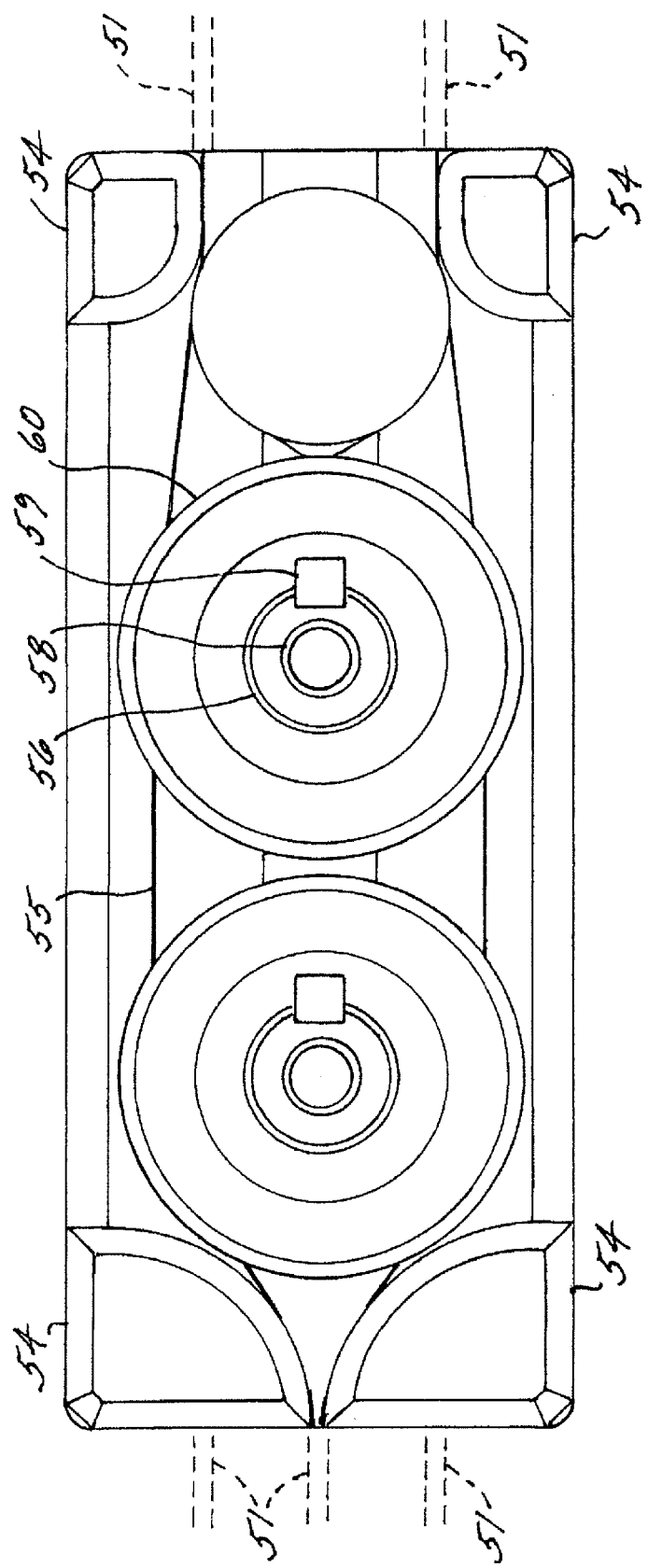
FIG. 23 is a plan view of a splice box of the invention.

In order to provide one of skill in the art an understanding of the concept embodied by this aspect of the invention, FIGS. 21–23 illustrate a particular embodiment of the optic fiber splice box sub 6. The splice box sub 6 is tubular and may be either concentric or eccentric with respect to the casing bore 4 within which the splice box sub 6 is located. The splice box sub body 46 may be supplied with metal-to-metal sealing threaded connections 47 at either end to allow connection to the tubing 1, or to other components of the system, as represented in FIG. 5, or it may be supplied as an integral part of the manifold sub 7, being located above the upper gauge ring 30 of said manifold sub, as represented in FIG. 1. The splice box sub body 46 may be bored to accept certain components or may be milled radially to accept components which are then covered with an enclosure cover 48. Well fluids are permitted to flow through the internal bore of the splice box sub 6 and within the annulus between the casing bore 4 and outer surface of the splice box sub 6.

The splice box sub body 46 and follower nut 49 include beveled edges to provide a smooth transition to the maximum tool diameter and to avoid impact or shock loading on corners during traverse of the well. Splice box body 46 and follower nut 49 are specifically designed, manufactured (precision machining) and treated (hardened surface preparation) utilizing close tolerance fits and geometry that yields low stress levels during impact/shock and axial and rotational loading while running the splice box sub 6 into or out of the well. Splice box sub body 46 and follower nut 49 ensure that enclosure cover 48 is not subjected to the mechanical forces encountered while traversing a well.

Fiber optic working control line 23 and fiber optic connector control line 28 are connected to the splice box sub fiber optic enclosure 50 via ports 51 drilled into the fiber optic enclosure 50, through the splice box sub body 46. These connections are sealable by a metal-to-metal sealing Jam Nut and Ferrule arrangement 52. The fiber optic conveying control line 53, housing the fibers to which the fibers within the fiber optic working control line 23 and fiber optic connector control line 28 must be spliced is connected to the fiber optic enclosure using the same general method. Moreover, additional ports 51 may be provided for the purpose of pressure testing the fiber optic enclosure 50 upon completion of the splicing procedure, or for the purpose of filling the void within the fiber optic enclosure with a chemically inert material, unaffected by temperature and pressure effects (for example, epoxy resin or similar) for the purpose of providing further resistance to vibrational effects within the fiber optic enclosure 50. Upon completion of said procedures, said ports 51 will be metal-to-metal sealed using Blanking Plugs, or similar.

Referring to FIG. 23, the fibers within the various control lines are introduced into the fiber optic enclosure 50 and the appropriate ends spliced together, to form a 'hardwired' continuous optic circuit. In order to achieve this, a considerable length of fiber is required, which must then be housed in a suitable protective enclosure 50, resistant to the deleterious effects of the inhospitable downhole environment (pressure, well content, etc.). Additionally, the internals of the enclosure 50 must ensure that the optic fiber 55 is not excessively bent during insertion into the enclosure, and that the bend radius of the fiber is kept to a maximum to ensure optic losses are kept to a minimum. This is especially critical at elevated temperatures. In order to achieve this desired aim of the invention, the optic fiber enclosure 50 is fitted with a series of cylindrical guides 54 around which the fibers 55 are wrapped. These fiber guides 54 provide general positioning of the fiber 55 within the confines of the fiber optic enclosure 50 and are tightly toleranced with respect to the walls of the enclosure 50, to ensure that vibration effects will not cause excessive movement and cause damage to the fiber 55. The fiber guides 54 are manufactured from a vibration/shock loading dampening material (for example, teflon, metal, or similar). In addition to the fiber guides 54, a number of fiber wrap subs 56 are provided. The fiber wrap subs 56 are profiled to mate with the inner surface of the fiber optic enclosure 50 to ensure against rotational movement. Additionally, they are secured to a boss 58 in the enclosure 50 inner surface via a tightly toleranced dowel pin 57. The fiber wrap subs 56 have a shallow groove machined around the outer diameter to assist in wrapping of the fiber 55 around them. Upon completion of the wrapping process, the fiber wrap sub cap 59 is installed and locked to the fiber wrap sub 56 via a key 60, preventing movement of the cap 59 and thereby preventing any damage to the fibers. Fiber wrap sub 56 and cap 59 are manufactured from a vibration/shock load dampening material (for example, teflon, metal, or similar).

In order to seal the optic fiber enclosure 50 from the downhole environment, the enclosure cover 48 is then slid into place to seal on the non-elastomeric or metal-to-metal seals 61, housed within grooves in the splice box sub body 46. The follower nut 49 is then threadedly connected to the splice box sub body 49 until it secures the enclosure cover 48 tightly in place. The follower nut is then locked in place via a lock nut, or set screws, or thread locking adhesive, or similar.

At this stage, the seals 61 between the splice box sub body 46 and enclosure cover 48 can be fully pressure tested to verify leak tightness. Confirmation of pressure integrity can be obtained via the additional ports 52 in the splice box sub body 46. The sealed optic fiber enclosure 50 can then be pumped full of void filling, vibration/shock load dampening material and the additional ports 52 sealed. The hydraulic fluid input control lines 25 are then placed over the bottom half of the splice box sub 46 and a protective cover 62 placed over the control lines. This protective cover 62 includes beveled edges to provide a smooth transition to the maximum tool diameter and to avoid impact or shock loading on corners during traverse of the well. The protective cover 62 is specifically designed, manufactured utilizing close tolerance fits and geometry that yields low stress levels during impact/shock and axial and rotational loading while running the splice box sub 6 into or out of the well. The cover is further preferably hardened to improved wear resistance. The cover is further preferably hardened to improve wear resistance.

The protective cover 62 ensures that the hydraulic fluid input control lines 25 are not damaged while traversing the well as they pass over the optic fiber enclosure cover 48. The protective cover may be secured in place via cap screws threadedly connected to the splice box sub body 46, or may be installed in a turned or milled groove in the splice box sub body 46, providing resistance to axial movement. A key installed between the protective cover 62 and splice box sub body 46 provides resistance to rotational movement. Alternatively, the protective cover 62 may be designed to fit closely between the mating threads of the threaded connections 47 on each end of the splice box sub body 46.

While preferred embodiments of the invention have been shown and described, various modifications and substitutions may be made thereto without departing from the spirit and scope of the invention. Accordingly, it is to be understood that the present invention has been described by way of illustration and not limitation.

What is claimed:

1. A downhole protector sub comprising:
   a manifold sub connectable axially in a tubing string and which sub includes an axial flow passage which is within an outside diameter of said manifold sub;
   a plurality of recesses formed in said outside diameter of said manifold sub;
   at least one fiber optic component mounted in an environmental condition insulator in at least one of said plurality of recesses.

2. A downhole protector sub as claimed in claim 1 wherein said manifold sub is an annulus.

3. A downhole protector sub as claimed in claim 1 wherein said manifold sub includes beveled edges.

4. A downhole protector sub as claimed in claim 1 wherein said insulator is a cover on at least one of said plurality of recesses in said manifold sub.

5. A downhole oil well protector sub for optic fiber junctions and components comprising:
   a housing having an outer surface and an inner surface, said inner surface defining a flow passage;
   at least one radial recess formed in said outer surface, said recess adapted to receive an optic fiber component; and
   at least one protected space, under a component protector, adapted to receive an optic fiber component said protected space being a radial recess formed in said outer surface and including a cover to cover said recess.

6. A downhole oil well protector sub for optic fiber junctions and components as claimed in claim 5 wherein said protected space is enclosed in said housing.

7. A downhole oil well protector sub for optic fiber junctions and components as claimed in claim 5 wherein said protected space is a radial recess formed in said outer surface and includes a cover to cover said recess.

8. A downhole oil well protector sub for optic fiber junctions and components as claimed in claim 5 wherein said protected space is further adapted to receive a vibration and shock absorber said protected space being further adapted to receive a vibration and shock absorber.

9. A downhole oil well protector sub for optic fiber junctions and components as claimed in claim 8 wherein said absorber is teflon.

10. A downhole oil well protector sub for optic fiber junctions and components as claimed in claim 5 wherein said component is an optic fiber connector.

11. A downhole oil well protector sub for optic fiber junctions and components as claimed in claim 5 wherein said component is an optic hydraulic valve.

12. A downhole oil well protector sub for optic fiber junctions and components as claimed in claim 5 wherein said component is a sensor.

13. A downhole oil well protector sub for optic fiber junctions and components as claimed in claim 5 wherein said component is a splice.

* * * * *